United States Patent
Han et al.

(10) Patent No.: US 7,642,870 B2
(45) Date of Patent: Jan. 5, 2010

(54) DEVICE AND METHOD FOR GENERATING AN ADJUSTABLE CHAOTIC SIGNAL

(75) Inventors: Sang-min Han, Yongin-si (KR); Oleg Popov, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 11/723,272

(22) Filed: Mar. 19, 2007

(65) Prior Publication Data

US 2007/0287397 A1  Dec. 13, 2007

(30) Foreign Application Priority Data

Jun. 9, 2006   (RU) ............................. 2006120279
Dec. 11, 2006  (KR) ..................... 10-2006-0125379

(51) Int. Cl.
 *H03B 29/00* (2006.01)
(52) U.S. Cl. ..................... 331/78; 327/291; 327/355; 332/117; 375/130
(58) Field of Classification Search ................. 331/78; 327/131, 291, 355, 361; 375/130; 332/117
See application file for complete search history.

(56) References Cited

U.S. PATENT DOCUMENTS 7,428,258 B2 *   9/2008   Fullerton et al. ............ 375/130

\* cited by examiner

*Primary Examiner*—Arnold Kinkead
(74) *Attorney, Agent, or Firm*—Sughrue Mion, PLLC

(57) ABSTRACT

A device and method for generating an adjustable chaotic signal are provided. The chaotic signal generation device includes a plurality of triangle pulse train generators which generate a plurality of triangle waves having different frequency cycles, an adder which adds the triangle waves output from the triangle pulse train generators and outputs a noise signal, and a frequency modulator which converts the noise signal to a certain frequency band to output a chaotic signal. Accordingly, the power consumption and cost are reduced and the manufacture of the chaotic signal generation device is simplified due to the components integrated on an IC. Also, a plurality of users can use wireless communications in a particular wireless communications area.

21 Claims, 10 Drawing Sheets

DEVICE AND METHOD FOR GENERATING AN ADJUSTABLE CHAOTIC SIGNAL

CROSS-REFERENCE TO RELATED APPLICATIONS

This application priority from Russian Patent Application No. RU2006120279, filed Jun. 9, 2006, in the Russian Patent Office, and the Korean Patent Application No. 2006-125379, filed Dec. 11, 2006, in the Korean Intellectual Property Office, the entire contents of which are incorporated herein by reference.

BACKGROUND OF THE INVENTION

1. Field of the Invention

Apparatuses and methods consistent with the present invention relate to generating an adjustable chaotic signal, and more particularly, to generating an adjustable chaotic signal so as to reduce power consumption and to be capable of adjusting the center frequency and bandwidth.

2. Description of the Related Art

Recently, wireless communications methods using an ultra wideband (UWB) frequency band in a spectrum of 3.1 GHz to 5.1 GHz other than Bluetooth have developed, among which is a method for transmitting information using a chaotic signal proposed by the IEEE 802.15.4a standard.

IEEE 802.15.4a is a Low Rate Alternative physical layer protocol (PHY) Task Group, and is a combination of a 802.15.4 (Zigbee) and 802.15.3 (UWB) with location capability and low power functions.

What is proposed to implement in low power is a chaotic signal modulation method. The chaotic signal modulation method is designed with a simple RF hardware structure and does not need circuits, such as voltage controlled oscillators (VCOs), phase locked loops (PLLs) and mixers, required for conventional wireless communications systems. Accordingly, power consumption can be reduced to 10 mW, ⅓ of conventional power consumption.

The core of the chaotic signal modulation method is a chaotic signal generation device for generating wideband chaotic signals. Conventional chaotic signal generation devices generate a chaotic signal in a UWB of 3.1 GHz to 5.1 GHz, and switch the chaotic signal on and off in an On Off keying (OOK) modulation method to convert the signal into a chaotic carrier.

However, the chaotic signal generated by such chaotic signal generation devices is a single signal in the entire frequency band of a UWB. Thus, if a plurality of users use wireless devices in a particular wireless communications area, utilization of the same channel results in interference. Consequently, only a single wireless device can transmit and receive wireless signals at any given time in a particular wireless communications area. That is, it is impossible to use a frequency division multiplexing (FDM) method in which a plurality of users carry out communications using a plurality of frequency channels in a particular communications area.

Moreover, as a chaotic signal is generated in the entire frequency band of a UWB and requires high non-linearity of a power amplifier, power consumption is high.

Hence, what is needed is that a plurality of users can spontaneously carry out wireless communications within a particular wireless communications area by generating a chaotic signal according to a frequency band, that is, a channel, in a chaotic signal generation device, resulting in enabling application of a FDM method. Also, a method is required for reducing power consumption.

SUMMARY OF THE INVENTION

An aspect of the present invention is to provide a device and method for generating an adjustable chaotic signal so as to reduce power consumption and to be capable of adjusting the center frequency and bandwidth for spontaneous wireless communication by a plurality of users.

In order to achieve the above and other aspects of the present invention, there is provided a chaotic signal generation device, comprising a plurality of triangle pulse train generators which generate a plurality of triangle waves having different frequency cycles, an adder which adds the triangle waves output from the triangle pulse train generators and outputs a noise signal, and a frequency modulator which converts the noise signal to a certain frequency band to output a chaotic signal.

The triangle pulse train generator may be a sawtooth generator.

The frequency cycles of the triangle waves generated from the triangle pulse train generators may have a prime number value.

The frequency modulator may be a voltage controlled oscillator (VCO) which adjusts an oscillation frequency band according to a given voltage.

The device may further comprise an amplitude controller which adjusts a frequency bandwidth of the chaotic signal output from the frequency modulator by controlling an amplitude of the noise signal.

The amplitude controller may be a variable amplifier and adjusts the frequency bandwidth of the chaotic signal according to an amplification gain of the variable amplifier.

The amplitude controller determines the frequency bandwidth of the chaotic signal corresponding to a width of a channel by adjusting the amplification gain.

The device may further comprise a direct current (DC) bias controller which adjusts a center frequency of the chaotic signal output from the frequency modulator by adjusting a DC offset applied to the noise signal.

The higher the DC bias value applied by the DC bias controller is, the higher the center frequency of the chaotic signal is.

The DC bias controller changes the center frequency of the chaotic signal so as to correspond to the frequency bandwidth of the channel.

In order to achieve the above and other aspects of the present invention, there is provided a method for generating a chaotic signal, comprising generating a plurality of triangle waves having different frequency cycles, adding the triangle waves and generating a noise signal, and converting the noise signal to a certain frequency band and generating a chaotic signal.

BRIEF DESCRIPTION OF THE DRAWINGS

The above and other aspects of the present invention will become more apparent by describing in detail exemplary embodiments thereof with reference to the attached drawing figures, wherein.

DETAILED DESCRIPTION OF EXEMPLARY EMBODIMENTS OF THE PRESENT INVENTION

Figure 1:
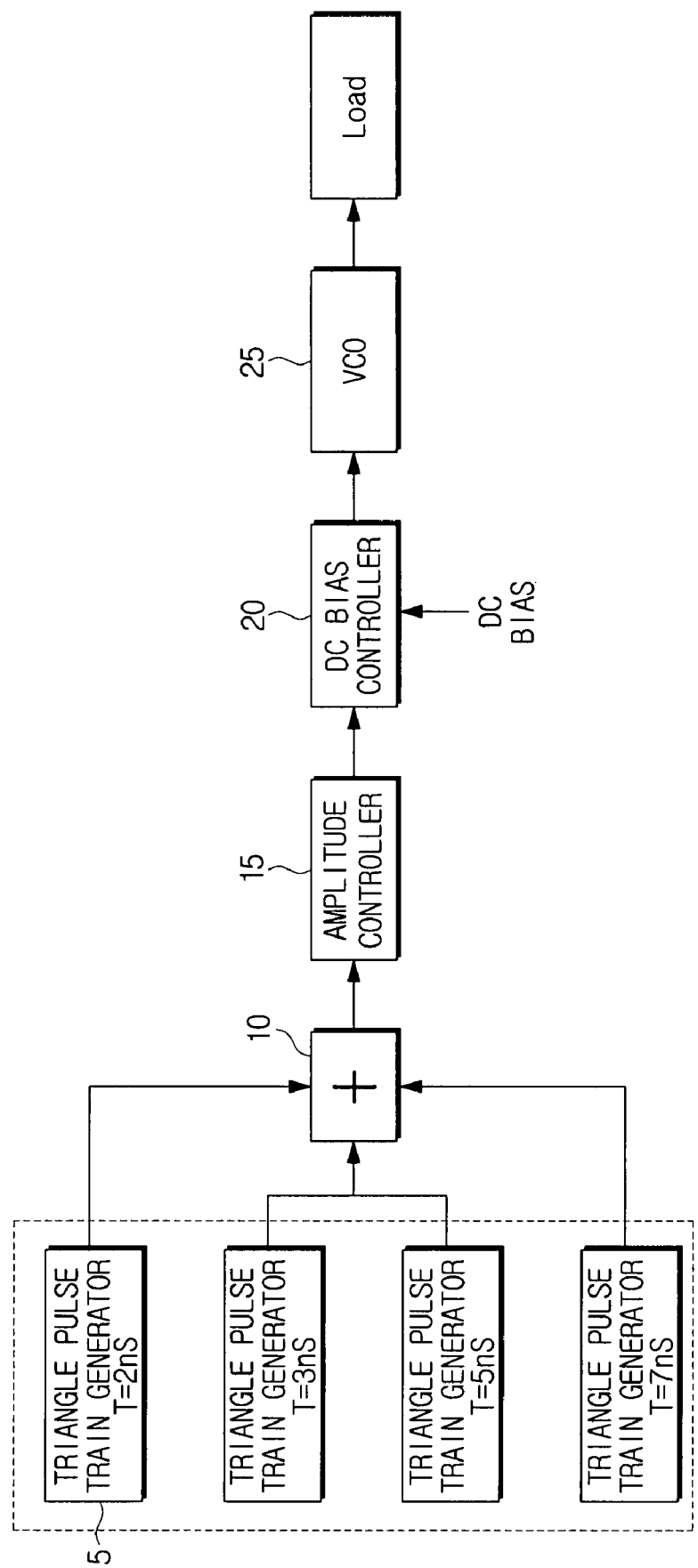
FIG. 1 is a block diagram illustrating the configuration of a chaotic signal generation device for UWB communications according to an exemplary embodiment of the present invention.

Hereinafter, exemplary embodiments of the present invention will be described in detail with reference to the accompanying drawing figures.

In the following description, the same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a block diagram illustrating the configuration of a chaotic signal generation device for UWB communications according to an exemplary embodiment of the present invention.

The chaotic signal generation device 1 generates a chaotic signal in a desired frequency band, and comprises a plurality of triangle pulse train generators 5, an adder 10, an amplitude controller 15, a direct current (DC) bias controller 20 and a voltage controlled oscillator (VCO) 25 which is a frequency modulator.

The triangle pulse train generator 5 is implemented with a sawtooth generator, and the frequency cycles of triangle waves generated from each of the triangle pulse train generators 5 are different. FIG. 1 illustrates 4 triangle pulse train generators 5 but if there are two or more triangle pulse train generators 5, a chaotic signal can be generated. The greater the number of triangle pulse train generators 5, the more complex the chaotic signal output from the VCO 25 is.

Triangle waves generated from each of the triangle pulse train generators 5 have different frequency cycles, so that the pulse widths of the triangle waves are different. The ratio of the frequency cycle of the triangle waves generated from each of the triangle pulse train generators 5 may be a prime number fold, that is, two-fold, three-fold, five-fold, seven-fold, eleven-fold, thirteen-fold, . . . , etc. In other words, the frequency cycles may be represented by the following EQN. 1, where $p_n$ is an nth prime number and x is a fixed value for all frequency cycles:

$$\text{frequency}_n = p_n \cdot x \qquad \text{EQN. [1]}$$

For example, if the frequency cycle of a triangle wave generated from one triangle pulse train generator 5 is 2 kHz, another triangle pulse train generator 5 generates a triangle wave having a frequency cycle of 3 kHz and yet another triangle pulse train generator 5 generates a triangle wave having a frequency cycle of 5 kHz. The triangle pulse train generators 5 generate sawtooth waves by configuring a voltage detector and a discharge circuit in an resistor-capacitor (RC) circuit or a constant current circuit, and can change the frequency cycle if an RC value or a constant current value is changed.

In order to minimize harmonic overlapping of triangle waves generated from each triangle pulse train generator 5, the ratio of the frequency cycles of the triangle waves generated from each triangle pulse train generator 5 become a prime number fold. If the ratio of the frequency cycles of the triangle waves generated from each triangle pulse train generator 5 become a multiple or inverse number, triangle waves interfere with every harmonic frequency and the power of the triangle waves grows in an area where the triangle waves overlap. Thus, if the power of the triangle waves grows, the amplitude controller 15 and a high power amplifier (not shown) connected to the end of the chaotic signal generation device 1 have to process high power signals, resulting in requiring a high capacity of the amplitude controller 15 and the high power amplifier and high linearity. Consequently, power consumption of the system increases and the cost also increases due to the use of an expensive element.

The adder 10 adds the plurality of triangle waves generated from each triangle pulse train generator 5 to generate a noise signal. As the ratio of each frequency cycle is a multiple of a prime number, harmonic overlapping between triangle waves is minimized, and thus the power of the noise signal output from the adder 10 is uniformly distributed. In other words, as the peak-to-average power ratio (PAPR) is low, high linearity of the amplitude controller 15 is not needed.

The amplitude controller 15 is implemented with a variable amplifier, and the variable amplifier adjusts an amplification gain according to the given voltage. The amplitude controller 15 adjusts the amplification gain of the noise signal provided from the adder 10, so that the frequency bandwidth of a chaotic signal output from the VCO 25 is adjustable. The higher the voltage given to the amplitude controller 15 is, the higher the amplification gain is. If the amplification gain increases, the frequency bandwidth of the chaotic signal increases. Likewise, if the amplification gain is low due to a low voltage given to the amplitude controller 15, the bandwidth of the chaotic signal decreases.

Such an amplitude gain which is adjustable by the amplitude controller 15 can be determined according to the width of a channel of the RF communications system within which the chaotic signal generation device 1 is embedded. For example, if the width of a channel of the RF communications system is wide, the frequency bandwidth increases by increasing an amplification gain of the amplitude controller 15, and if the width of a channel of the RF communications system is narrow, the frequency bandwidth decreases by reducing the amplification gain of the amplitude controller 15.

The DC bias controller 20 provides a DC bias to a noise signal, and the DC bias adjusts the center frequency of a chaotic signal output from the VCO 25. The DC bias controller 20 alters the center frequency of a chaotic signal by adjusting a DC bias value. The range of the center frequency adjustable by the DC bias controller 20 linearly varies according to the given DC bias value. The higher the DC bias value is, the higher the center frequency is, and the lower a DC bias value is, the lower the center frequency is. As the DC bias controller 20 adjusts the center frequency of a chaotic signal, a chaotic signal corresponding to each channel used in an RF communications system can be generated.

The DC bias controller 20 may alter the center frequency by adjusting the DC bias value according to the communication state of a channel. For example, if the communication state is lowered due to the change of a communication environment or other wireless communications device using the same channel is introduced into the same communication area, the DC bias controller 20 can change the channel by adjusting the DC bias value.

The VCO 25 generates a chaotic signal by adjusting the frequency of a noise signal according to voltage received by the VCO 25. The VCO 25 changes the oscillation frequency according to the change of the given voltage, and receives a noise signal and generates a chaotic signal in a desired or predetermined frequency band. The triangle pulse train generator 5 oscillates a triangle wave in the band close to the base band, but the VCO 25 generates a frequency in the band ranging from MHz to GHz. Accordingly, if the frequency band of a noise signal increases in the VCO 25, the wavelength is shortened, and thus the noise signal is converted into a dense chaotic signal.

The fluctuation range of an oscillation frequency output from the VCO 25 is broader than that of the DC bias controller 20 according to the given voltage.

FIGS. 2A-2D are graphs illustrating triangle waves generated by the four triangle pulse train generators.

Figure 2A:
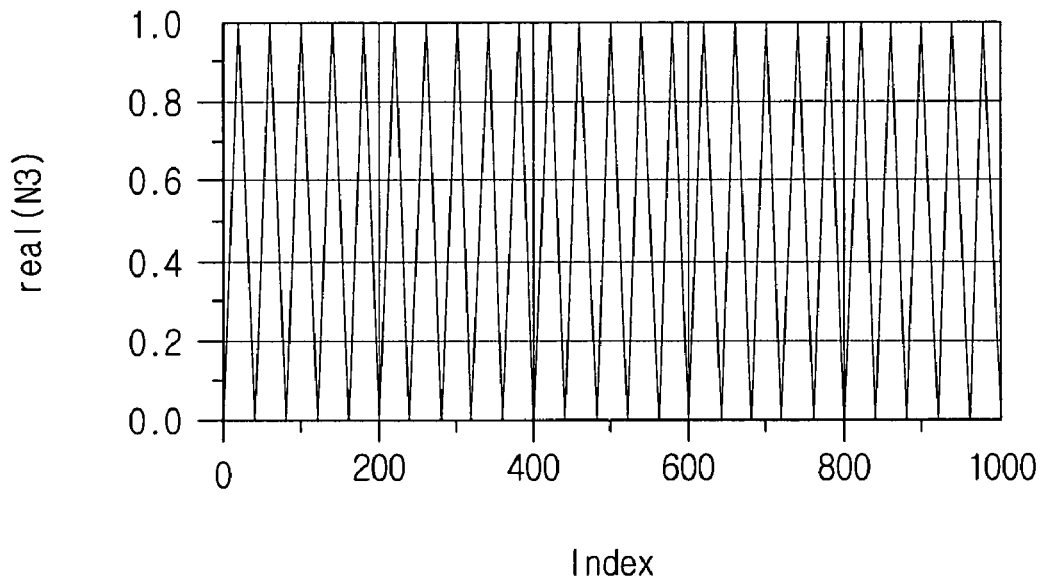
FIGS. 2A-2D are graphs illustrating triangle waves generated by 4 triangle pulse train generators.
Figure 2B:
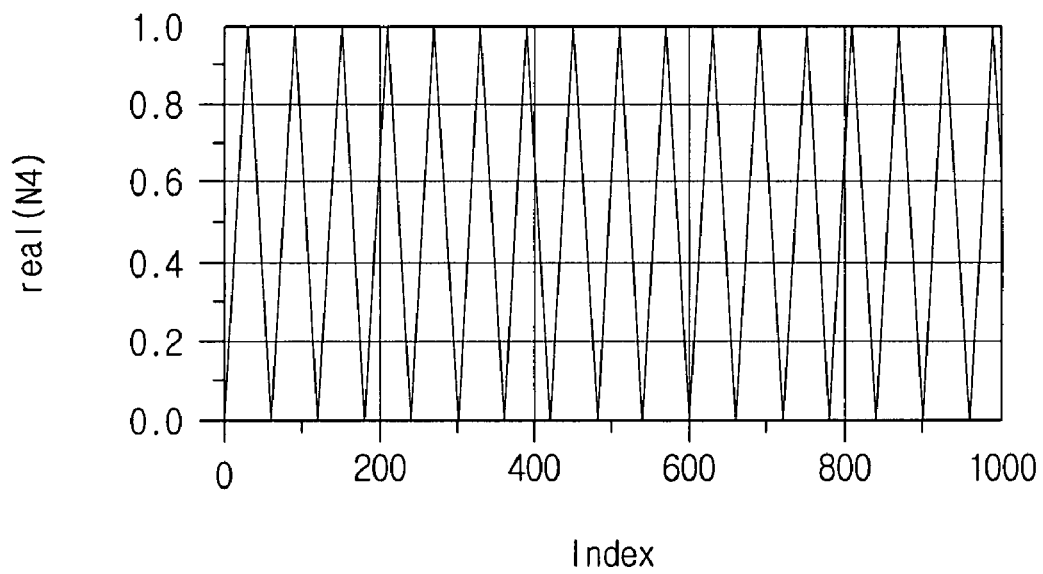
Figure 2C:
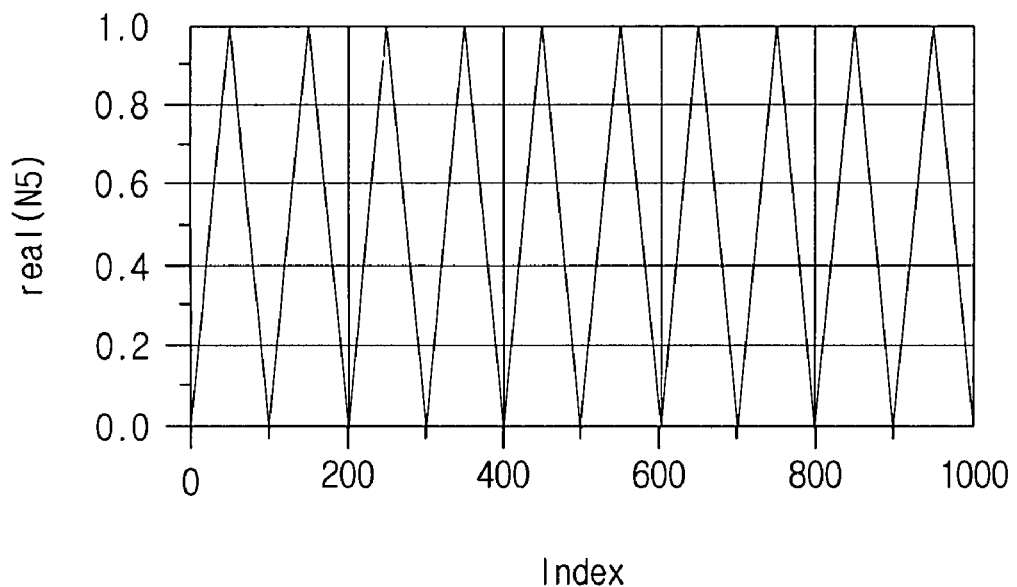
Figure 2D:
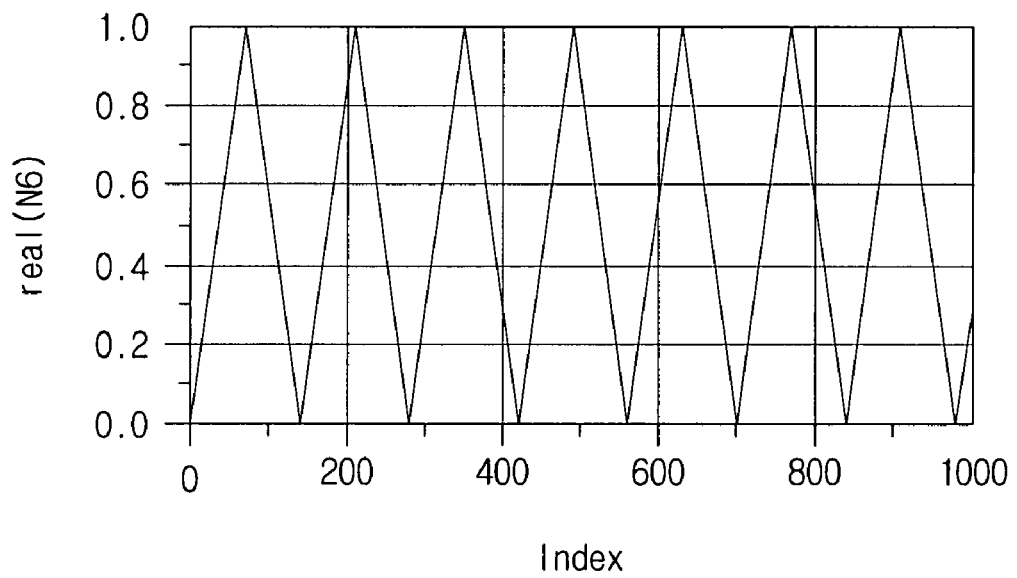

The frequency cycle of a triangle wave generated from the triangle pulse train generator of FIG. 2A has a value of two, the frequency cycle of a triangle wave of FIG. 2B has a value of three, the frequency cycle of a triangle wave of FIG. 2C has a value of five, and the frequency cycle of a triangle wave of FIG. 2D is has a value of seven.

In such an implementation, as the frequency cycle of each of the triangle waves is a prime number value, harmonic overlapping between the triangle waves can be minimized.

Figure 3:
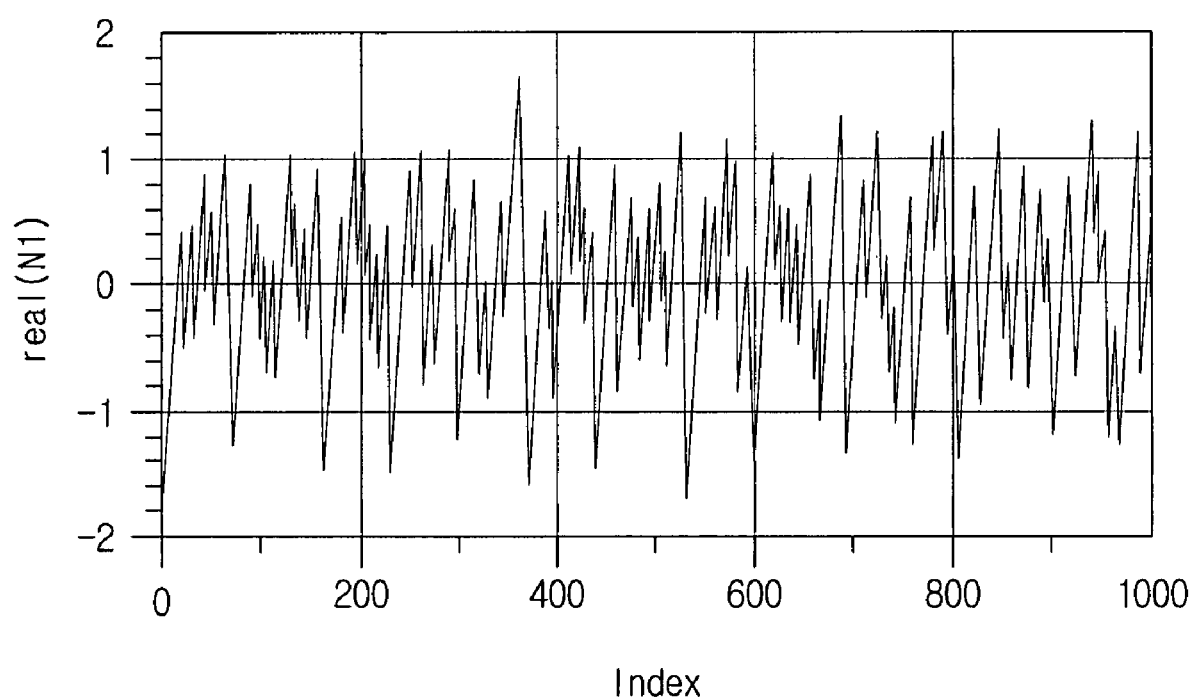
FIG. 3 illustrates a waveform of a noise signal output from the adder of FIG. 1.

FIG. 3 illustrates a waveform of a noise signal output from an adder of FIG. 1.

The adder 10 adds each of the triangle waves output from the triangle pulse train generator 5 and outputs a noise signal as shown in FIG. 3. The noise signal is provided to the amplitude controller 15 and then the DC bias controller 20.

Figure 4A:
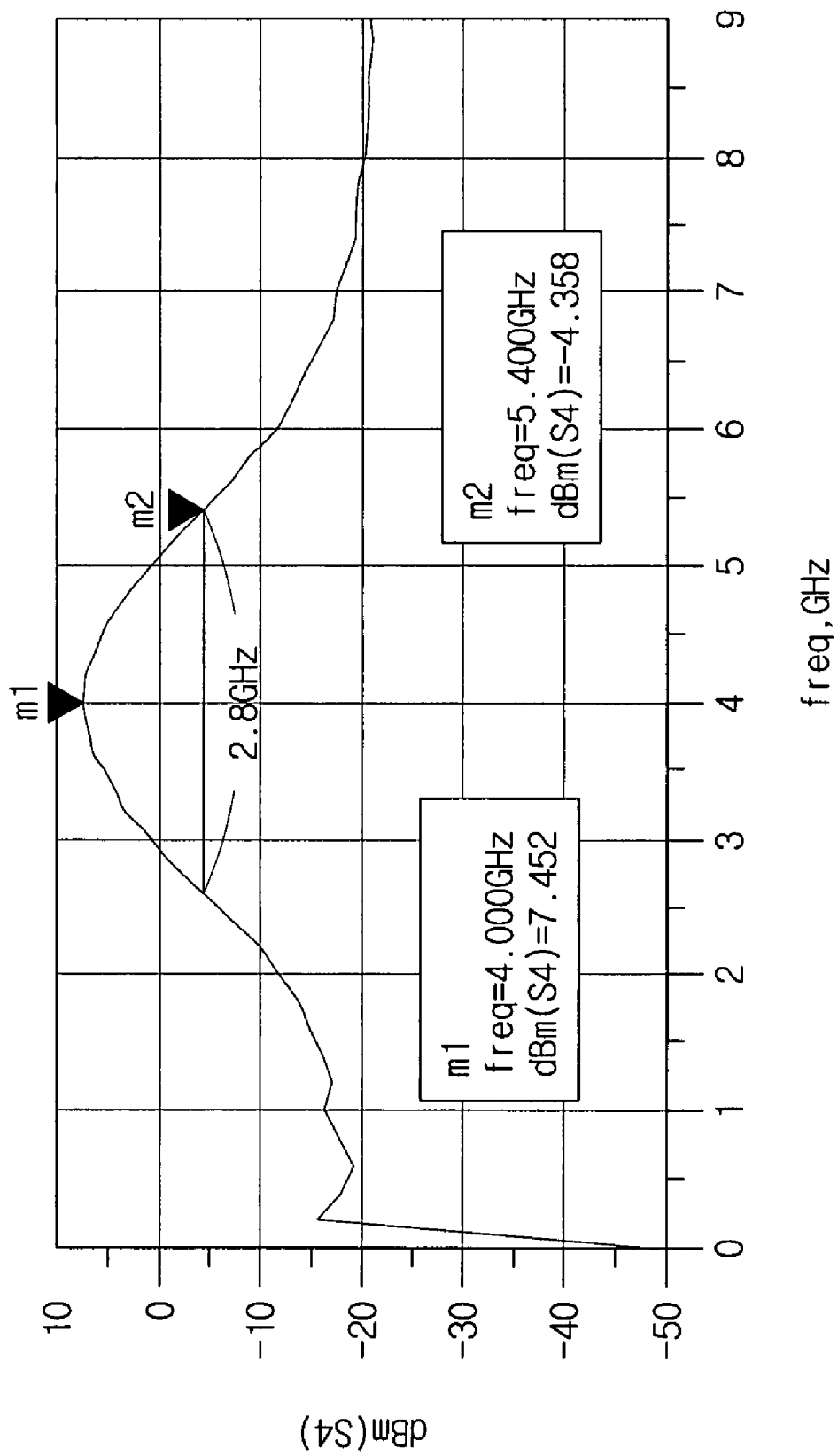
FIGS. 4A and 4B are graphs simply illustrating spectrums of a chaotic signal output from a voltage controlled oscillator (VCO) according to an adjustment of the amplification gain of an amplitude controller of FIG. 1.
Figure 4B:
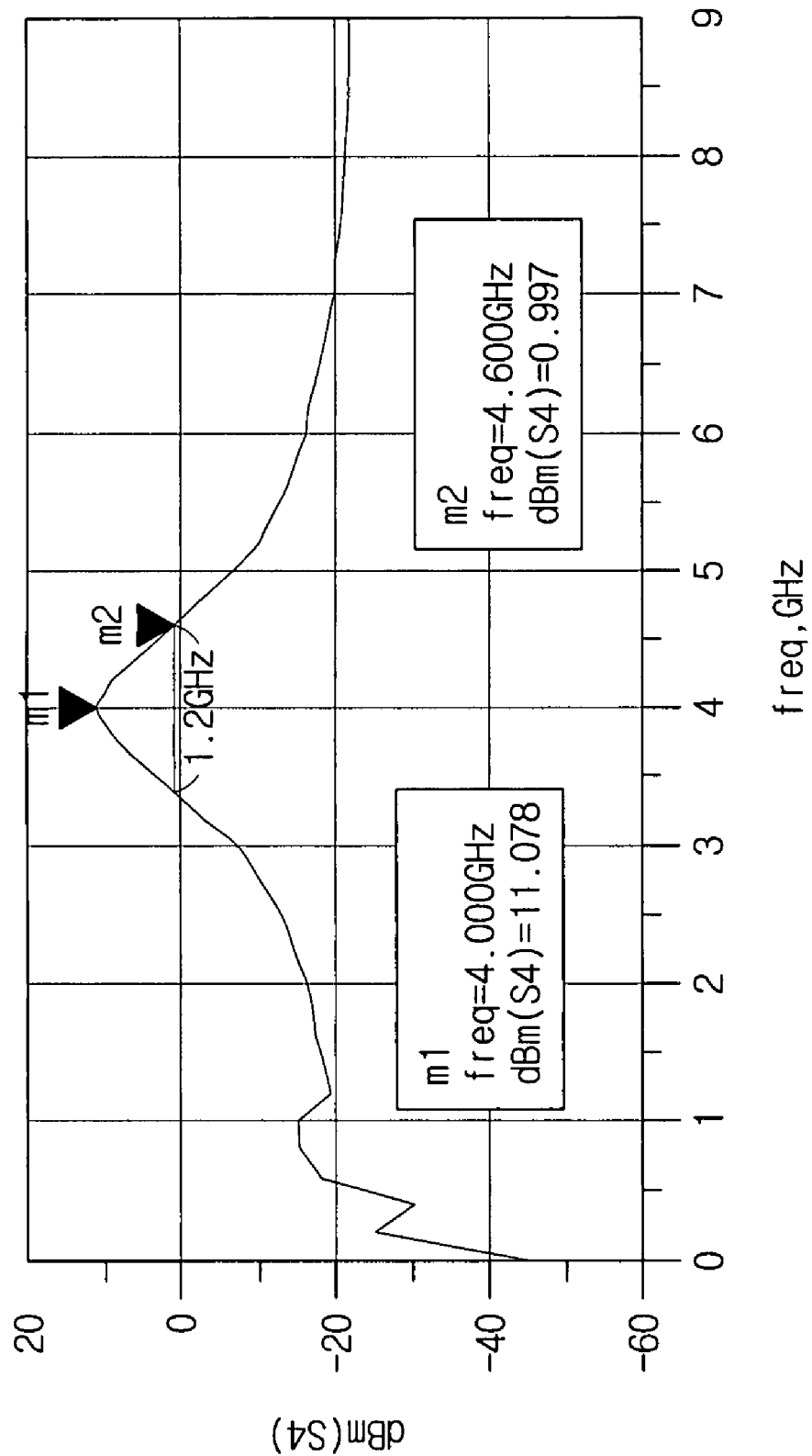

FIGS. 4A and 4B are graphs simply illustrating waveforms of a chaotic signal output from a voltage controlled oscillator (VCO) according to an adjustment of the amplification gain of the amplitude controller 15. FIGS. 4A and 4B shows the results of adjusting the amplification gain when the center frequency is 4 GHz, that is, when a DC bias is fixed.

FIG. 4A is measured when the amplification gain of the amplitude controller 15 is high. The gain in the center frequency ml of 4 GHz is 7.452 dBm, and the frequency bandwidth at −4.357 dBm, which is different from that level by approximately 10 dB, is 2.8 GHz.

On the other hand, FIG. 4B is measured when the amplification gain of the amplitude controller 15 is low. The gain in the center frequency ml of 4 GHz is 11.078 dBm, and the frequency bandwidth at 0.977 dBm, which is different from that level by approximately 10 dB, is 1.2 GHz.

Therefore, it is known that if the amplification gain of the amplitude controller 15 increases, the frequency bandwidth also increases, and if the amplification gain of the amplitude controller 15 decreases, the frequency bandwidth also decreases.

Figure 5:
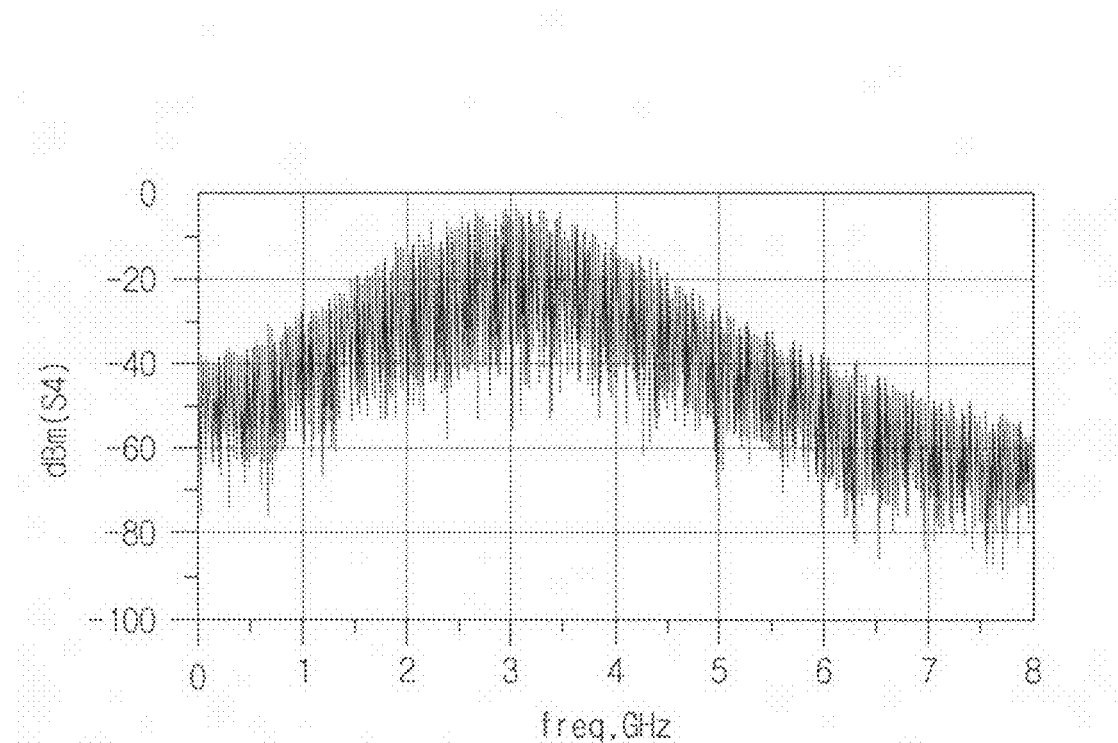
FIG. 5 is a graph illustrating the feature of a spectrum of a waveform of a chaotic signal output from the VCO of FIG. 1.
Figure 6:
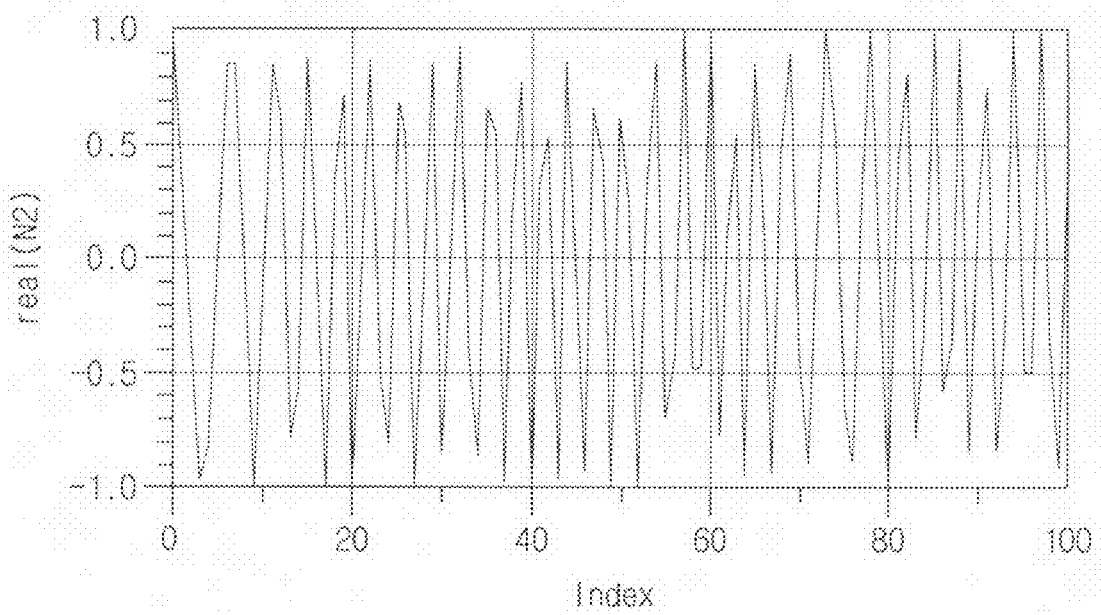
FIG. 6 is a graph illustrating a waveform of a chaotic signal of FIG. 5 in a time base.

FIG. 5 is a graph illustrating the features of a spectrum of a waveform of a chaotic signal output from the VCO 25, and FIG. 6 is a graph illustrating a waveform of the chaotic signal of FIG. 5 in a time base.

FIG. 5 shows a spectrum of a chaotic signal having a center frequency of 3 GHz, and shows that the gain in the center frequency area of the chaotic signal is high. If wireless communications devices transmit and receive a chaotic signal in a wireless communications, wireless communications devices sense only chaotic signals higher than a certain gain. Accordingly, chaotic signals higher than a certain gain can be used as a channel.

Such a chaotic signal, as shown in FIG. 6, has comparatively uniform pulse size. That is, the PAPR of the chaotic signal is low. This is the advantage of chaotic generation method by frequency modulation.

Figure 7A:
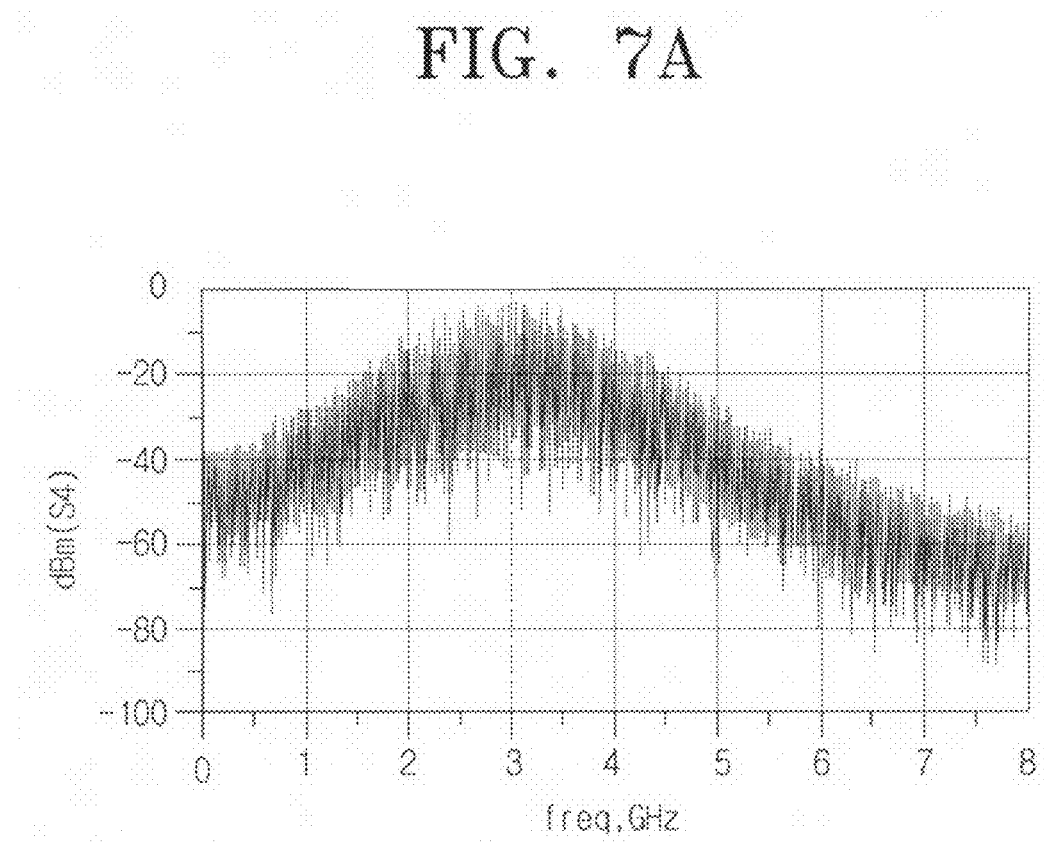
FIGS. 7A-7C are graphs illustrating waveforms of a chaotic signal output from a VCO according to adjustment of a direct current (DC) bias value of a DC bias controller.
Figure 7B:
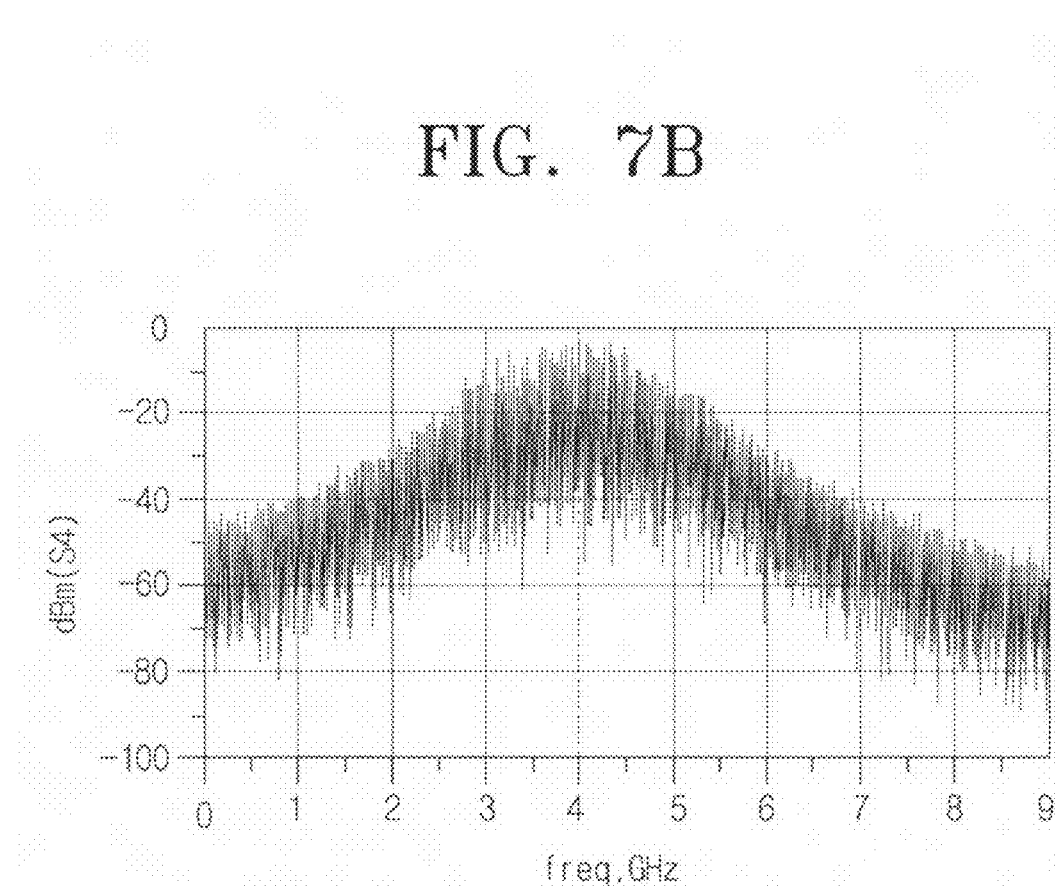
Figure 7C:
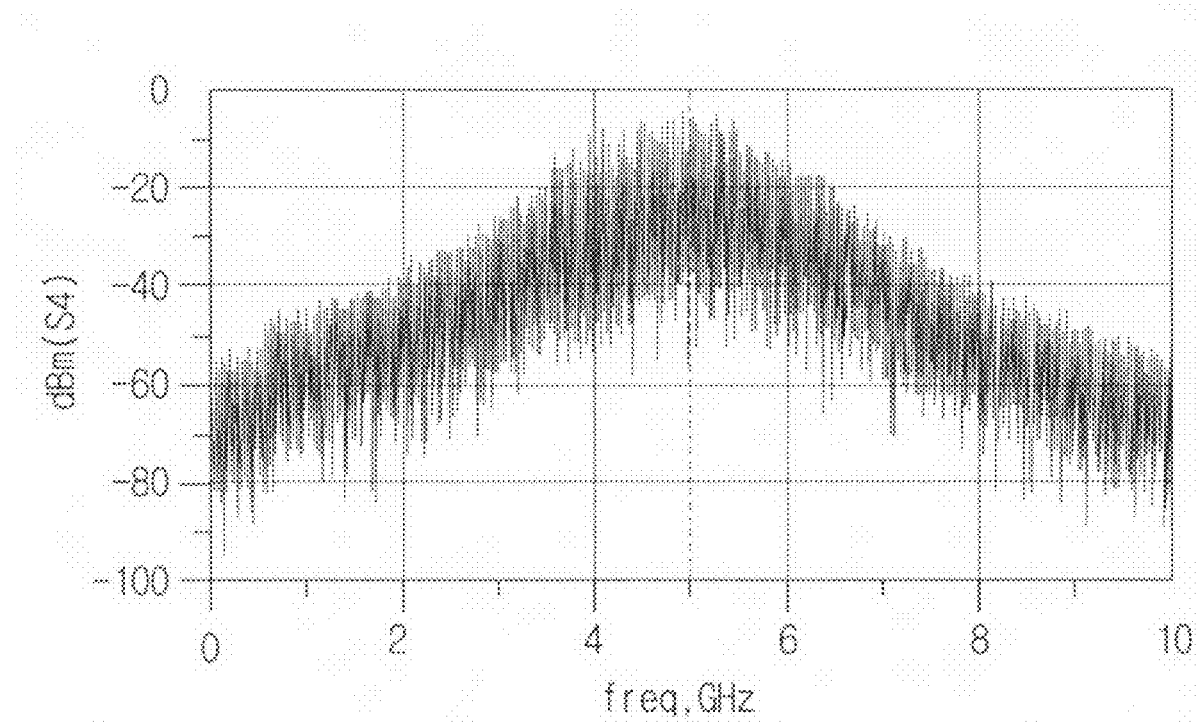

FIGS. 7A-7C are graphs illustrating waveforms of a chaotic signal output from the VCO 25 according to an adjustment of a DC bias value of the DC bias controller 20.

In other words, FIGS. 7A-7C are graphs illustrating waveforms of a chaotic signal as the phase of a DC bias value increases.

The center frequency of a chaotic signal in FIG. 7A is 3 GHz. If the DC bias value increases, the center frequency of a chaotic signal increases to 4 GHz as in FIG. 7B, and if the DC bias value is increases further, the center frequency of a chaotic signal becomes 5 GHz as in FIG. 7C. Channels are adjustable if the DC bias value given to the DC bias controller 20 is adjusted.

Figure 8:
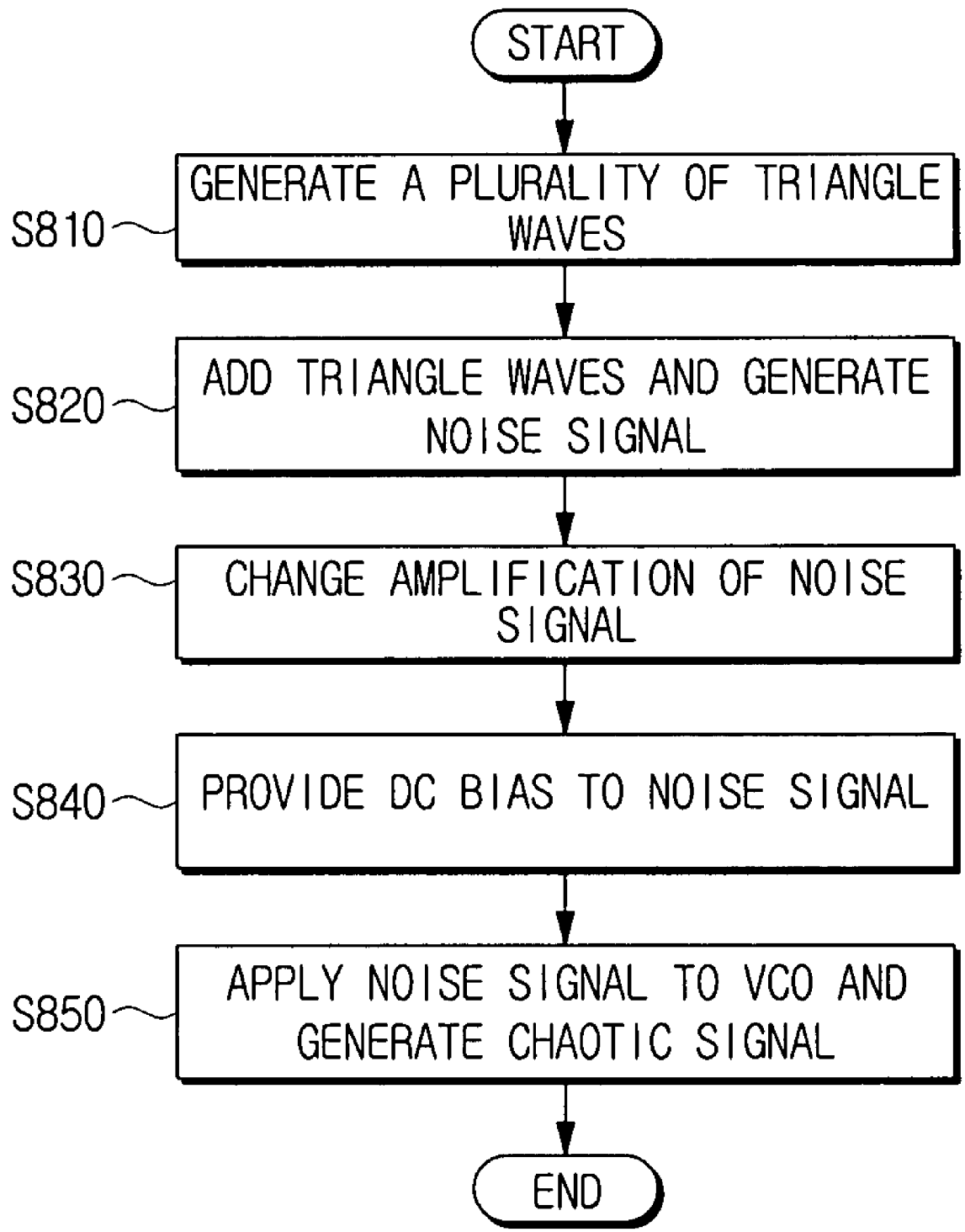
FIG. 8 is a flow diagram illustrating the process of generating a chaotic signal using a chaotic signal generation device according to an exemplary embodiment of the present invention.

FIG. 8 is a flow diagram illustrating the process of generating a chaotic signal using a chaotic signal generation device according to an exemplary embodiment of the present invention.

Firstly, in S810, the plurality of triangle pulse train generators 5 generates a plurality of triangle waves having different frequency cycles. In S820, the adder 10 receives and adds each of the triangle waves to generate a noise signal.

In S830, the amplification controller 15 receives the noise signal and changes the amplification of the noise signal. The amplitude controller 15 adjusts the amplification gain, so that the frequency bandwidth of a chaotic signal output from the VCO 25 is adjustable.

In S840, the DC bias controller 20 receives the amplification-changed noise signal and is given with a DC bias value corresponding to a desired channel to output a chaotic signal corresponding to the desired channel.

In S850, the VCO receives the noise signal given with the DC bias and generates a chaotic signal by converting the noise signal to a desired frequency band. As the amplification gain is adjusted by the amplification controller 15 and the DC bias value is adjusted by the DC bias controller 20, the VCO 25 can output a chaotic signal having a desired center frequency and a desired frequency bandwidth. That is, the chaotic signal generation device 1 according to an exemplary embodiment of the present invention can output a chaotic signal having an adjusted channel and bandwidth.

In the chaotic signal generation device 1 according to an exemplary embodiment of the present invention, a noise signal is simply generated using the triangle pulse train generators 5 and harmonic overlapping between triangle waves is minimized, so the PAPR of a chaotic signal may be reduced. Accordingly, the power consumption and cost can be reduced without the necessity of increasing the linearity of a power amplifier.

Moreover, the frequency bandwidth of a chaotic signal is adjustable by adjusting the amplification gain, and the center frequency of a chaotic signal is adjustable by adjusting a DC bias value, so a plurality of channels can be implemented and the bandwidth of a channel is adjustable. Therefore, users can use different channels so that interference between users does not occur and thus a plurality of users can use wireless communications in a particular wireless communications area.

It is easy to fabricate the chaotic signal generation device 1 according to an exemplary embodiment of the present invention due to simple configuration, compact size and components integrated on an integrated circuit (IC).

As can be appreciated from the above description of the present invention, the power consumption and cost are reduced and the manufacture of the chaotic signal generation device is simplified due to the components integrated on an IC. Also, a plurality of users can use wireless communications in a particular wireless communications area.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A chaotic signal generation device, comprising:
    a plurality of triangle pulse train generators which generate a plurality of triangle waves having different frequency cycles;
    an adder which adds the plurality of triangle waves output from the plurality of triangle pulse train generators and outputs a noise signal; and
    a frequency modulator which converts the noise signal to a chaotic signal.

2. The device of claim 1, wherein the plurality of triangle pulse train generators are sawtooth generators.

3. The device of claim 1, wherein the frequency cycles of the plurality of triangle waves generated from the plurality of triangle pulse train generators have prime number values.

4. The device of claim 1, wherein the frequency modulator is a voltage controlled oscillator (VCO) which adjusts an oscillation frequency band according to a given voltage.

5. The device of claim 1, further comprising an amplitude controller which adjusts a frequency bandwidth of the chaotic signal output from the frequency modulator by controlling an amplitude of the noise signal.

6. The device of claim 5, wherein the amplitude controller is a variable amplifier and adjusts the frequency bandwidth of the chaotic signal according to an amplification gain of the variable amplifier.

7. The device of claim 6, wherein the amplitude controller determines the frequency bandwidth of the chaotic signal corresponding to a width of a channel by adjusting the amplification gain.

8. The device of claim 1, further comprising a direct current (DC) bias controller which adjusts a center frequency of the chaotic signal output from the frequency modulator by adjusting a DC bias applied to the noise signal.

9. The device of claim 8, wherein increasing the DC bias value applied by the DC bias controller increases the center frequency of the chaotic signal.

10. The device of claim 9, wherein the DC bias controller changes the center frequency of the chaotic signal so as to correspond to the frequency bandwidth of the channel.

11. A method for generating a chaotic signal, comprising:
    generating a plurality of triangle waves having different frequency cycles;
    adding the plurality of triangle waves and generating a noise signal; and
    converting the noise signal to a chaotic signal.

12. The method of claim 11, wherein in the generating of the plurality of triangle waves, the frequency cycles of the plurality of triangle waves are formed in prime number folds.

13. The method of claim 11, further comprising adjusting a frequency bandwidth of the chaotic signal by controlling an amplitude of the noise signal.

14. The method of claim 11, further comprising adjusting a center frequency of the chaotic signal by adjusting a DC bias applied to the noise signal.

15. The method of claim 11, wherein the noise signal is converted to the chaotic signal by adjusting a frequency of the noise signal.

16. A method for generating a chaotic signal, comprising:
    generating a plurality of signals having different prime number-fold frequencies;
    adding the plurality of signals and generating a noise signal; and
    converting the noise signal to a chaotic signal.

17. The method of claim 11, wherein the plurality of triangle waves comprises a first triangle wave having a first frequency and a second triangle wave having a second frequency.

18. The method of claim 17, wherein a ratio of the first frequency to the second frequency is a prime-number fold.

19. The method of claim 17, wherein the first and the second triangle waves are of uniform sawtooth shape.

20. The method of claim 16, wherein the plurality of signals comprises a first triangle wave having a first frequency and a second triangle wave having a second frequency, and a ratio of the first frequency to the second frequency is a prime-number fold.

21. The method of claim 16, wherein the plurality of signals comprises a first triangle wave and a second triangle wave, and the first and the second triangle waves are of uniform sawtooth shape.

* * * * *